United States Patent
Oshimi

(10) Patent No.: US 7,811,351 B2
(45) Date of Patent: Oct. 12, 2010

(54) HONEYCOMB STRUCTURAL BODY AND EXHAUST GAS TREATING APPARATUS

(75) Inventor: Yukio Oshimi, Ibi-gun (JP)

(73) Assignee: Ibiden Co., Ltd., Ogaki-shi (JP)

( * ) Notice: Subject to any disclaimer, the term of this patent is extended or adjusted under 35 U.S.C. 154(b) by 334 days.

(21) Appl. No.: 11/874,790

(22) Filed: Oct. 18, 2007

(65) Prior Publication Data
US 2008/0190083 A1 Aug. 14, 2008

(30) Foreign Application Priority Data
Feb. 9, 2007 (WO) .................. PCT/JP2007/052361

(51) Int. Cl.
B01D 39/20 (2006.01)
B32B 3/12 (2006.01)
(52) U.S. Cl. .............................. 55/523; 55/524; 55/529; 55/DIG. 30; 422/177; 422/180; 428/116
(58) Field of Classification Search ............ 55/523, 55/524, 529, DIG. 30; 422/177, 180; 428/116
See application file for complete search history.

(56) References Cited

U.S. PATENT DOCUMENTS

| | | | | |
|---|---|---|---|---|
| 5,316,710 | A * | 5/1994 | Tasaki et al. | 264/630 |
| 5,916,530 | A * | 6/1999 | Maus et al. | 422/179 |
| 6,299,958 | B1 | 10/2001 | St. Julien et al. | |
| 6,375,014 | B1 * | 4/2002 | Garcera et al. | 210/490 |
| 7,112,233 | B2 * | 9/2006 | Ohno et al. | 55/523 |
| 7,396,586 | B2 | 7/2008 | Ohno et al. | |
| 7,427,309 | B2 * | 9/2008 | Ohno et al. | 55/523 |
| 7,497,999 | B2 * | 3/2009 | Ichikawa | 422/177 |
| 7,517,502 | B2 * | 4/2009 | Ohno et al. | 422/177 |
| 7,556,782 | B2 * | 7/2009 | Ohno et al. | 422/180 |
| 7,591,918 | B2 * | 9/2009 | Suwabe et al. | 156/89.22 |
| 2006/0021310 | A1 | 2/2006 | Ohno et al. | |
| 2006/0051556 | A1 | 3/2006 | Ohno et al. | |
| 2006/0068159 | A1 * | 3/2006 | Komori et al. | 428/116 |
| 2007/0178275 | A1 | 8/2007 | Takahashi | |
| 2007/0196620 | A1 | 8/2007 | Ohno et al. | |
| 2007/0212517 | A1 | 9/2007 | Ohno et al. | |
| 2008/0083202 | A1 | 4/2008 | Kunieda et al. | |
| 2008/0120950 | A1 | 5/2008 | Ohno et al. | |
| 2008/0136062 | A1 | 6/2008 | Kasai et al. | |
| 2008/0138567 | A1 | 6/2008 | Ninomiya et al. | |

(Continued)

FOREIGN PATENT DOCUMENTS

EP 0535871 4/1993

(Continued)

*Primary Examiner*—Michael A Marcheschi
*Assistant Examiner*—Robert A Clemente
(74) *Attorney, Agent, or Firm*—Ditthavong Mori & Steiner, P.C.

(57) ABSTRACT

A pillar-shaped honeycomb structural body includes a first end face and a second end face substantially parallel to each other; and a peripheral surface connecting the first end face and the second end face. The first end face and the second end face have similar peripheral shapes. A taper rate P satisfies $0 < P \leq$ approximately 4%, the taper rate P being expressed by the formula (1), taper rate $P(\%) = (D1-D2)/(2L) \times 100$, wherein the maximum width of the first end face is D1, the maximum width of the second end face is D2, and the distance between the first end face and the second end face is L.

23 Claims, 11 Drawing Sheets

U.S. PATENT DOCUMENTS

| | | |
|---|---|---|
| 2008/0174039 A1 | 7/2008 | Saijo et al. |
| 2008/0197544 A1 | 8/2008 | Saijo et al. |
| 2008/0211127 A1 | 9/2008 | Naruse et al. |
| 2008/0213485 A1 | 9/2008 | Shibata |
| 2008/0236115 A1 | 10/2008 | Sakashita |
| 2008/0236724 A1 | 10/2008 | Higuchi |
| 2008/0237942 A1 | 10/2008 | Takamatsu |
| 2008/0241015 A1 | 10/2008 | Kudo et al. |
| 2008/0284067 A1 | 11/2008 | Naruse et al. |
| 2008/0305259 A1 | 12/2008 | Saijo |
| 2008/0318001 A1 | 12/2008 | Sakakibara |
| 2009/0004431 A1 | 1/2009 | Ninomiya |
| 2009/0011176 A1 * | 1/2009 | Ichikawa .................. 428/116 |
| 2009/0107879 A1 | 4/2009 | Otsuka et al. |
| 2009/0130378 A1 | 5/2009 | Imaeda et al. |

FOREIGN PATENT DOCUMENTS

| | | |
|---|---|---|
| EP | 1491257 | 12/2004 |
| EP | 1502640 | 2/2005 |
| EP | 1533032 | 5/2005 |
| EP | 1857427 | 11/2007 |
| JP | 61004813 | 1/1986 |
| JP | 2002-106337 | 4/2002 |
| JP | 2005-125182 | 5/2005 |
| JP | 2007-014886 | 1/2007 |
| WO | WO 2006/095835 | 9/2006 |

* cited by examiner

HONEYCOMB STRUCTURAL BODY AND EXHAUST GAS TREATING APPARATUS

CROSS-REFERENCE TO RELATED APPLICATIONS

The present application claims priority under 35 U.S.C. §120 to PCT Application No. PCT/JP2007/052361, filed Feb. 9, 2007. The contents of this application are incorporated herein by reference in their entirety.

BACKGROUND OF THE INVENTION

1. Field of the Invention

The present invention relates to a honeycomb structural body and an exhaust gas treating apparatus.

2. Discussion of the Background

Conventionally, various kinds of exhaust gas treating apparatuses for internal combustion engines of vehicles, construction machines, or the like have been proposed and put to practical use. A typical exhaust gas treating apparatus includes an exhaust pipe communicating with an exhaust gas manifold of the engine. In the middle of the exhaust pipe, there is provided a casing made of, e.g., metal, and a honeycomb structural body is provided inside the casing. The honeycomb structural body captures particulates in the exhaust gas, and functions as a filter (DPF: diesel particulate filter) for purifying the exhaust gas or as a catalyst carrier for converting toxic gas components in the exhaust gas with a catalyst reaction.

For example, if the honeycomb structural body were used as a DPF, the honeycomb structural body would include plural pillar-shaped cells extending in a lengthwise direction, which cells are partitioned by porous cell walls. Each cell is sealed by a sealing material at one end. Thus, the exhaust gas introduced inside the honeycomb structural body inevitably passes through the cell walls before being exhausted from the honeycomb structural body. Accordingly, it is possible to capture the particulates in the exhaust gas as the exhaust gas passes through the cell walls. If the honeycomb structural body were used as a catalyst carrier, the lengthwise surface of each cell wall is provided with a catalyst carrying layer and a catalyst. Toxic gas such as CO, HC, and $NO_x$ included in the exhaust gas is converted by this catalyst. Typically, a holding seal member made of an inorganic fiber mat is provided between the honeycomb structural body and the casing. This holding seal member prevents the honeycomb structural body from breaking as a result of contacting the casing (JP2005-125182A). The entire contents of JP2005-125182A are hereby incorporated by reference.

SUMMARY OF THE INVENTION

The present invention provides a pillar-shaped honeycomb structural body including a first end face and a second end face substantially parallel to each other; and a peripheral surface connecting the first end face and the second end face, wherein the first end face and the second end face have similar peripheral shapes; and a taper rate P satisfies 0<P≦approximately 4%. The taper rate P is expressed by the following formula (1), taper rate $P(\%) = (D1-D2)/(2L) \times 100$, wherein the maximum width of the first end face is D1, the maximum width of the second end face is D2, and the distance between the first end face and the second end face is L.

BRIEF DESCRIPTION OF THE DRAWINGS

Other objects, features and advantages of the present invention will become more apparent from the following detailed description when read in conjunction with the accompanying drawings, in which.

DESCRIPTION OF THE EMBODIMENTS

A description is given, with reference to the accompanying drawings, of an embodiment of the present invention.

A honeycomb structural body used as a diesel particulate filter (DPF) for capturing particulates in exhaust gas is described as an example of an embodiment of the present invention. However, it is obvious to those skilled in the art that the honeycomb structural body according to an embodiment of the present invention can be used as a catalyst carrier, as described below.

According to one embodiment of the present invention, a pillar-shaped honeycomb structural body includes a first end face and a second end face substantially parallel to each other; and a peripheral surface connecting the first end face and the second end face. The first end face and the second end face have similar peripheral shapes. A taper rate P satisfies 0<P≦approximately 4%, the taper rate P being expressed by the following formula (1)

$$\text{taper rate } P(\%) = (D1-D2)/(2L) \times 100 \quad \text{formula (1)}$$

where the maximum width of the first end face is D1, the maximum width of the second end face is D2, and the distance between the first end face and the second end face is L.

According to another embodiment of the present invention, an exhaust gas treating apparatus includes an introduction portion through which exhaust gas is introduced; an exhaust portion through which the exhaust gas is discharged; and the honeycomb structural body described above, the honeycomb structural body being provided between the introduction portion and the discharge portion. The honeycomb structural body is provided in such a manner that the first end face faces the introduction portion through which the exhaust gas is introduced.

In these years, exhaust gas is becoming increasingly high-temperature and high-pressure. Thus, the honeycomb structural body is more inclined to break due to various factors (for example, thermal stress, thermal cycle, etc.) caused by high temperature while using the exhaust gas treating apparatus. After the honeycomb structural body is used as a filter, a regenerating process is performed for removing the captured particulates (i.e., a restoring process for making the filter reusable). Particularly during this regenerating process, the temperature of the portion where the exhaust gas is discharged rises considerably. Therefore, due to thermal stress, this portion of the honeycomb structural body is extremely susceptible to breakage.

According to an embodiment of the present invention, a honeycomb structural body can be made resistant to breakage even under high temperature.

Figure 1:
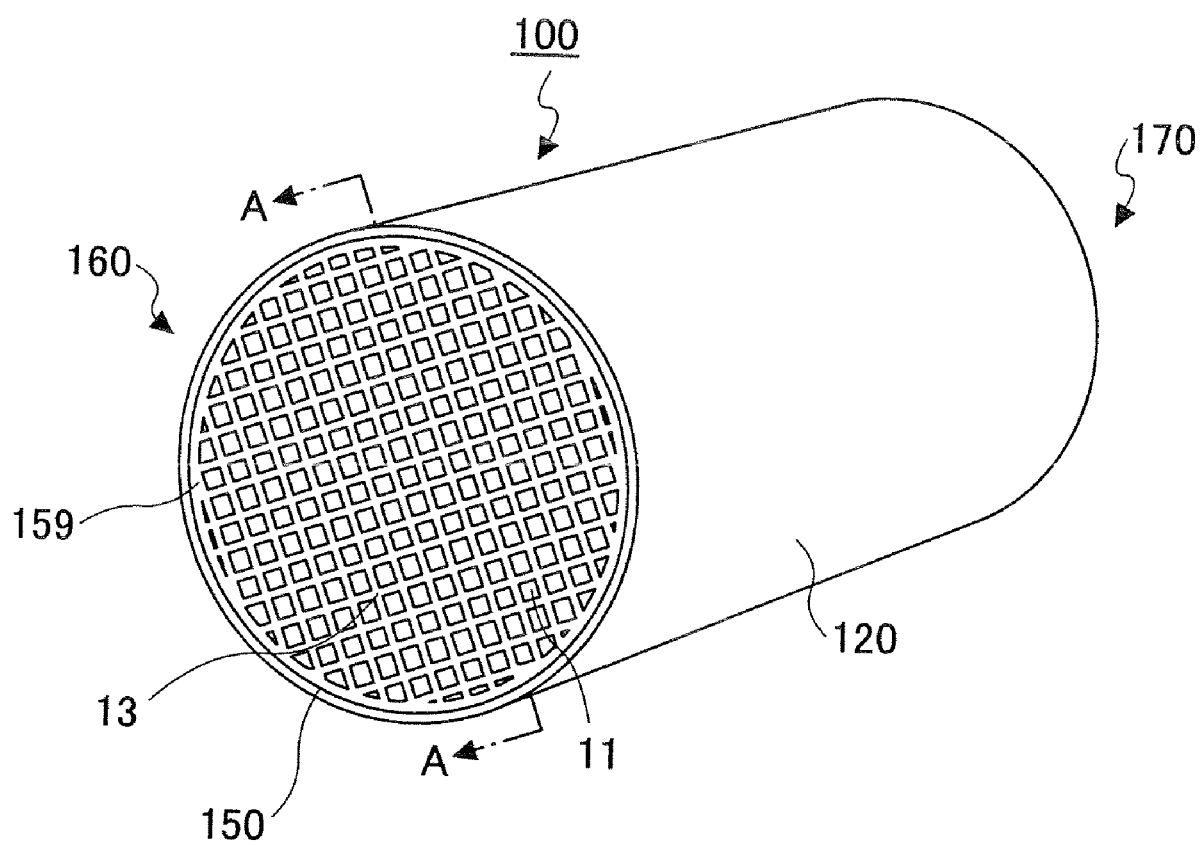
FIG. 1 is a schematic perspective view of an example of an integral type honeycomb structural body according to an embodiment of the present invention.
Figure 2:
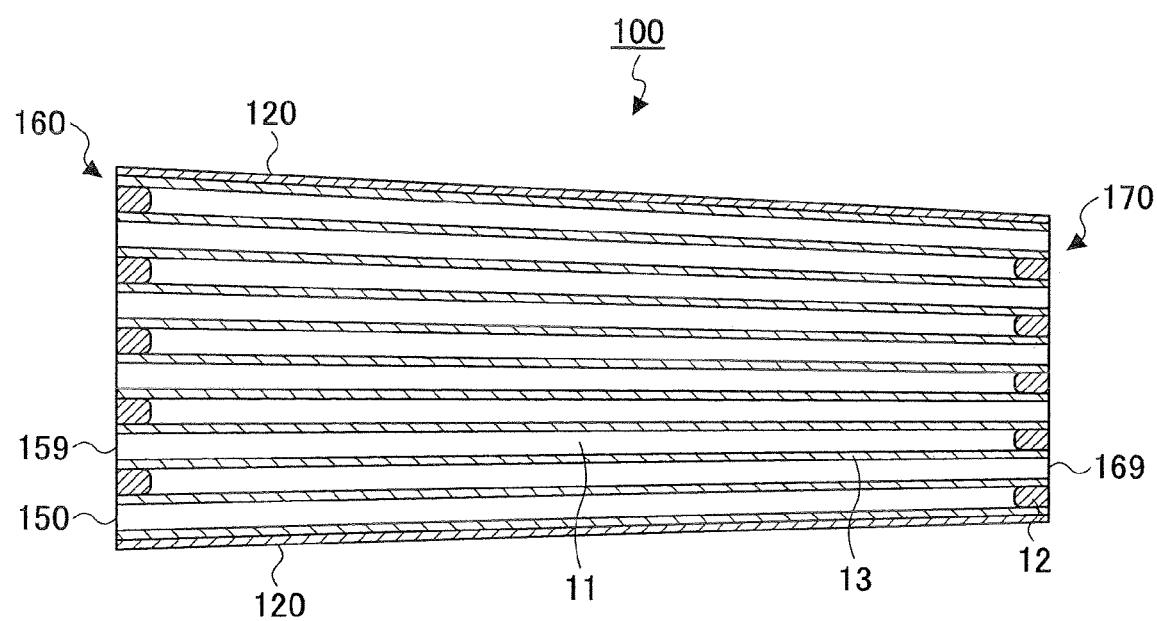
FIG. 2 is a cross-sectional view taken along line A-A of the honeycomb structural body shown in FIG. 1.

FIG. 1 is a schematic diagram of an example of a honeycomb structural body according to an embodiment of the present invention. FIG. 2 is a cross-sectional view taken along line A-A of the honeycomb structural body shown in FIG. 1.

As shown in FIG. 1, a honeycomb structural body 100 according to an embodiment of the present invention includes two end faces (hereinafter referred to as "first end face 160" and "second end face 170") and a peripheral surface connecting the two end faces. Furthermore, the honeycomb structural body 100 according to the embodiment of the present invention includes an integral ceramic block 150 and a coat layer 120 arranged on at least part of the periphery (side surface) of the integral ceramic block 150, excluding the two end faces of the integral ceramic block 150 (hereinafter referred to as "first end face 159" and "second end face 169" of the integral ceramic block). Accordingly, the peripheral surface of the honeycomb structural body 100 is formed by the side surface of the integral ceramic block 150 and/or the coat layer 120. The first end face 160 of the honeycomb structural body 100 is formed by the first end face 159 of the integral ceramic block and a side face of the coat layer 120 on the same side as the first end face 160. Similarly, the second end face 170 of the honeycomb structural body 100 is formed by the second end face 169 of the integral ceramic block and a side face of the coat layer 120 on the same side as the second end face 170. However, the coat layer 120 can be omitted from the honeycomb structural body 100 according to the embodiment of the present invention.

As shown in FIGS. 1 and 2, in the integral ceramic block 150, multiple cells 11 are arranged in such a manner as to extend from the first end face 159 toward the second end face 169. Cell walls 13 partitioning the cells 11 function as filters. As shown in FIG. 2, each of the cells 11 in the integral ceramic block 150 is sealed by a sealing material 12 at one of the ends corresponding to either the first end face 159 or the second end face 169 of the integral ceramic block. Accordingly, when exhaust gas flows into one of the cells 11, the exhaust gas inevitably passes through one of the cell walls 13 of the corresponding cell 11 before being exhausted from another one of the cells 11.

An embodiment of the present invention is characterized in that the peripheral shape of the honeycomb structural body 100 is tapered. Therefore, the first end face 160 and the second end face 170 of the honeycomb structural body 100 have similar shapes but have different sizes. The taper rate P is 0<P≦approximately 4%. The taper rate P (%) can be expressed by a formula (1) below, where the maximum width of the first end face of the honeycomb structural body 100 is D1 (mm) the maximum width of the second end face of the honeycomb structural body 100 is D2 (mm), and the distance between the first end face and the second end face (i.e., the overall length or the length in the X direction of the honeycomb structural body 100) is L (mm).

$$P(\%) = (D1-D2)/(2L) \times 100 \quad \text{formula (1)}$$

In the present application, the terms "taper (shape)" or "tapering" mean that the honeycomb structural body 100 has a shape in which/is shaped in such a manner that the sectional area of the face parallel to the first end face 160 of the honeycomb structural body 100 monotonously decreases from the first end face 160 toward the second end face 170. It is to be noted that the contour of the peripheral surface connecting the first end face 160 and the second end face 170 of the honeycomb structural body 100 can be linear or curved.

The method of measuring the maximum widths D1 and D2 of the first and second end faces of the honeycomb structural body 100 is not particularly limited; however, in order to measure them with high precision, it is preferable to use a measuring apparatus that has a laser projector and a laser-photodetector, such as a laser dimension measuring instrument (e.g., LS-5120 or LS-5500 manufactured by Keyence Corporation). When a laser dimension measuring instrument is used for the measurement, the honeycomb structural body is arranged in such a manner that the first end face (or the second end face) is placed along a line connecting the projector and the photodetector that faces the projector. Then, a laser beam is irradiated from the projector toward the first end face of the honeycomb structural body in such a manner that the laser beam is parallel to the first end face, and the laser beam is detected by the photodetector on the opposite side. This operation is performed while rotating the honeycomb structural body around its central axis by 360°. Accordingly, the maximum width D1 of the first end face of the honeycomb structural body 100 (or the maximum width D2 of the second end portion) can be measured.

In the example shown in FIG. 1, the first end face 160 and the second end face 170 of the honeycomb structural body 100 are both circular and the contours of the peripheral surface are linear. Furthermore, the taper rate P is approximately 2% and the radial difference between the first end face 160 and the second end face 170 is 3 mm (the overall length L of the honeycomb structural body is 150 mm).

Particularly, in an embodiment of the present invention, the honeycomb structural body 100 is preferably made to have a tapered shape by either one of the following methods.

1) Continuously decrease the sectional area of the face perpendicular to the central axis (X axis in FIG. 2) of the integral ceramic block 150 from the first end face 159 toward the second end face 169.

2) Continuously decrease the thickness of the coat layer 120 from the first end face 160 toward the second end face 170 of the honeycomb structural body 100.

Generally, in the case of 1), the thickness of the coat layer 120 is preferably constant from the first end face 160 toward the second end face 170 of the honeycomb structural body 100. However, in exceptional cases, the thickness of the coat layer 120 can continuously change (decrease or increase) from the first end face 160 toward the second end face 170 of the honeycomb structural body 100. Generally, in the case of 2), the sectional area of the face perpendicular to the central axis (X axis in FIG. 2) of the integral ceramic block 150 is preferably substantially constant. However, in exceptional cases, the sectional area of the face perpendicular to the central axis (X axis in FIG. 2) of the integral ceramic block 150 can continuously change (decrease or increase) from the first end face 159 toward the second end face 169. That is, what is important in the embodiment of the present invention is the final external shape of the honeycomb structural body 100; as long as the above characteristics are satisfied, the shape of each of the components (the integral ceramic block 150 and coat layer 120) of the honeycomb structural body is not important.

The following are examples of methods for forming the integral ceramic block 150 having a tapered shape as shown in FIGS. 1 and 2. In the case of 1), an integral ceramic block having a tapered shape as shown in FIGS. 1 and 2 is fabricated by extrusion molding. In the process of extrusion molding, the speed of extruding the molded body from the mold (die) is gradually increased or gradually decreased. Accordingly, an integral ceramic block having a tapered shape can be easily fabricated. That is, by increasing the extruding speed, the sectional area of the face perpendicular to the central axis can be decreased. Conversely, by decreasing the extruding speed, the sectional area of the face perpendicular to the central axis can be increased. Furthermore, it is also possible to fabricate an integral ceramic block having a tapered shape in the process of drying the molded body by changing the drying speed with respect to the central axis.

Figure 3:
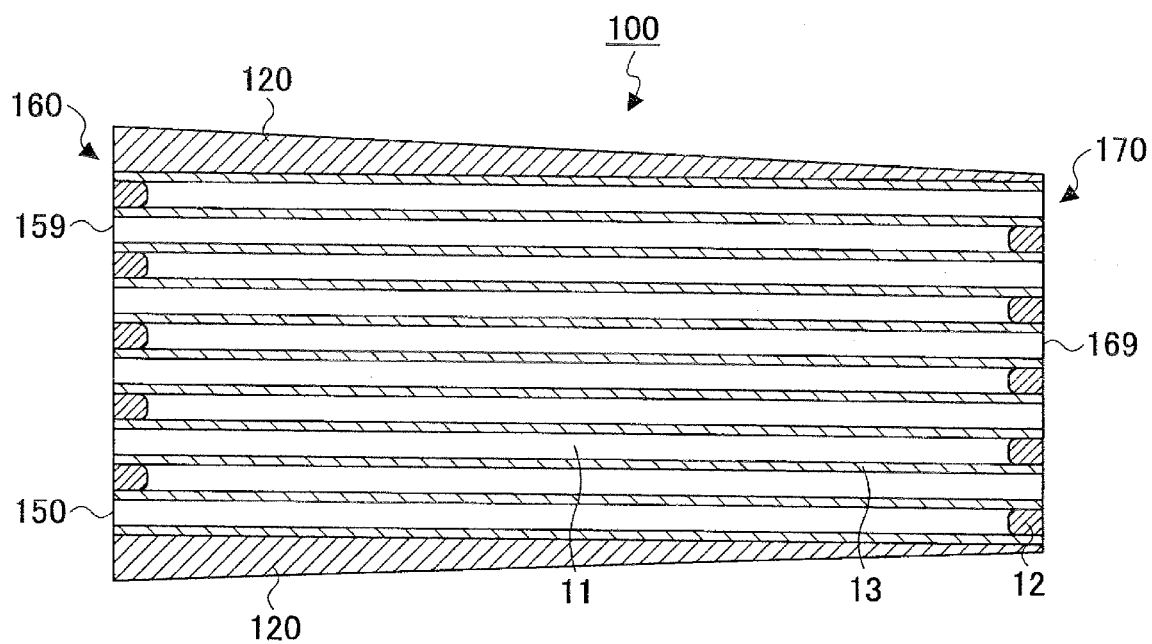
FIG. 3 is a schematic diagram of another integral type honeycomb structural body according to an embodiment of the present invention, which is a sectional view parallel to the central axis (X axis)
Figure 4:
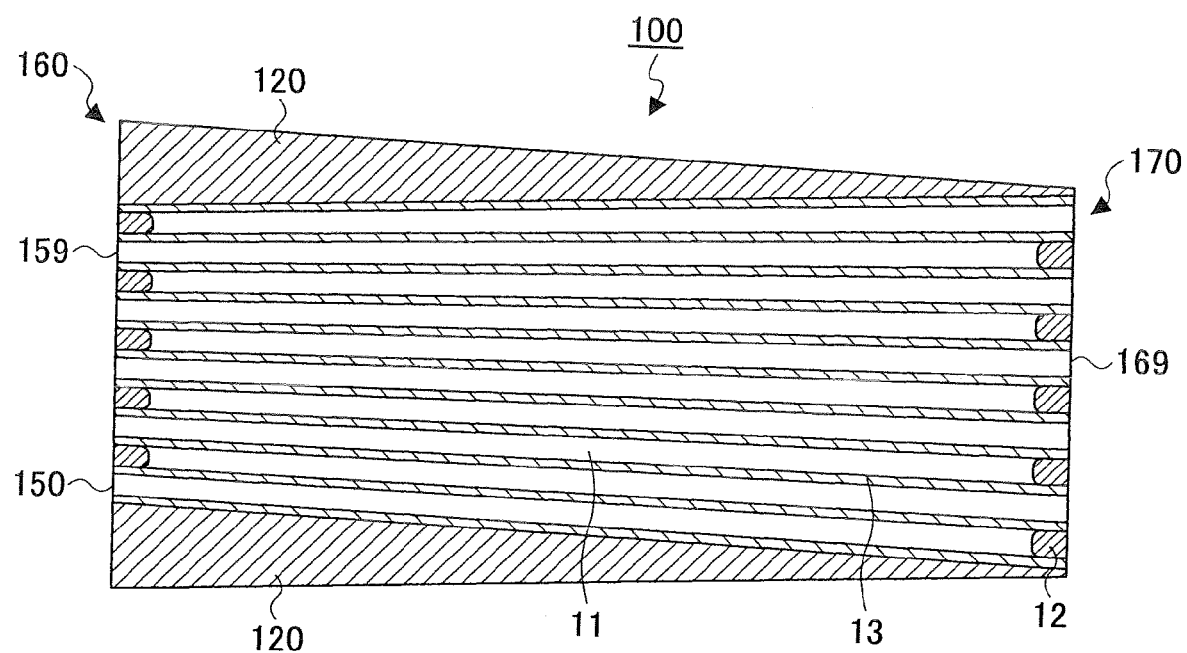
FIG. 4 is a schematic diagram of yet another integral type honeycomb structural body according to an embodiment of the present invention, which is a sectional view parallel to the central axis (X axis)

In the case of 2), i.e., in the case of changing the thickness of the coat layer 120 with respect to the central axis (X axis) of the honeycomb structural body 100, first, the integral ceramic block 150 having a side surface that is substantially parallel along the central axis (X axis) as shown in FIG. 3 is fabricated. Then, on the side surface, the coat layer 120 is applied in such a manner that its thickness decreases from the first end face 160 toward the second end face 170. As mentioned above, it is to be noted that the contour of the integral ceramic block 150 need not be substantially parallel along the central axis. For example, as shown in FIG. 4, the integral ceramic block 150 can have a shape in which the sectional area of the face perpendicular to the central axis (X axis) increases from first end face 159 toward the second end face 169, as opposed to the above. In this case, the thickness of the coat layer 120 on the periphery is adjusted in such a manner that the two end faces and the overall length L of the honeycomb structural body 100 satisfy the above relationship.

Figure 5:
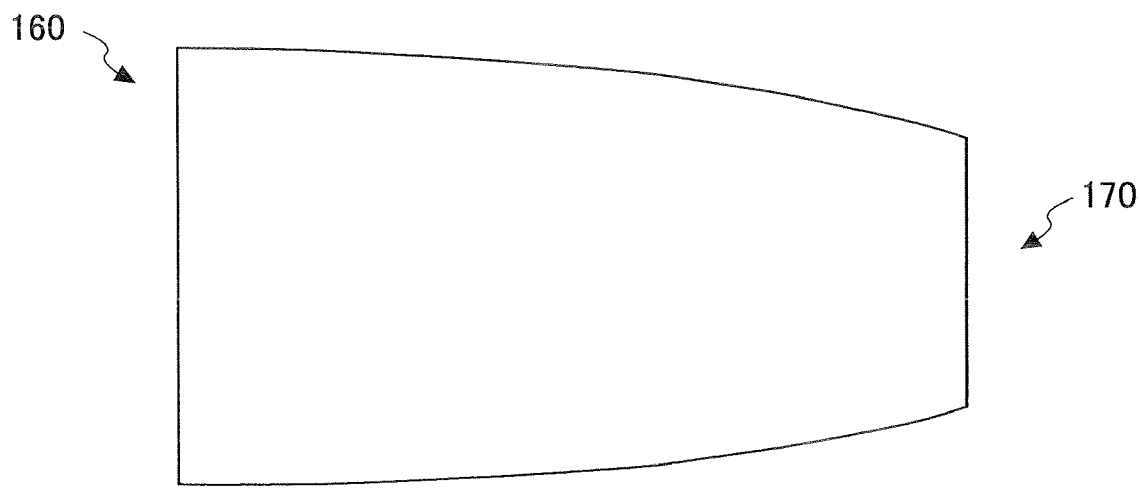
FIG. 5 is an example of a side view of a honeycomb structural body according to an embodiment of the present invention.
Figure 6:
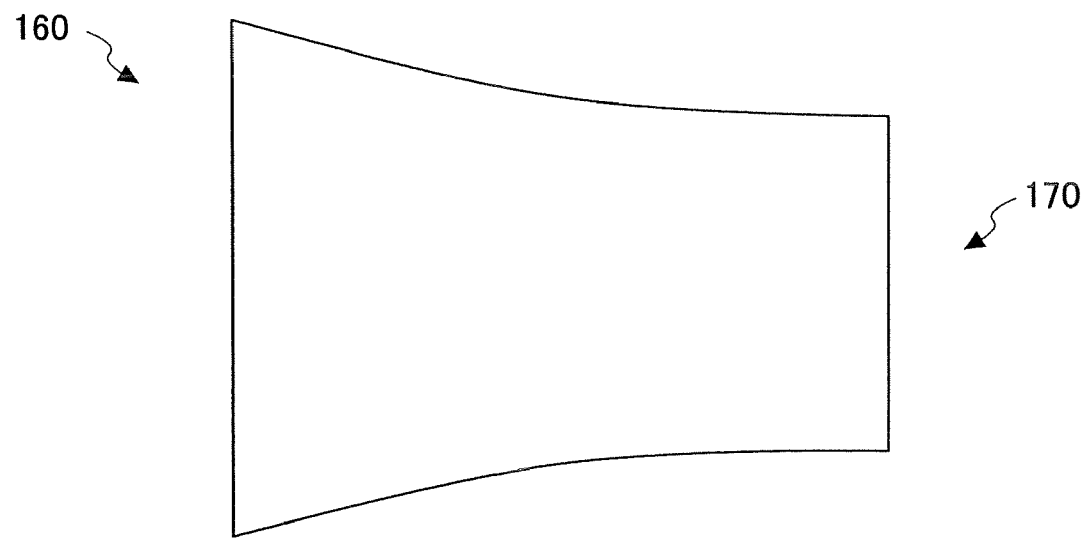
FIG. 6 is an example of a side view of another honeycomb structural body according to an embodiment of the present invention.

In the above example, the honeycomb structural body 100 has a tapered shape in which the peripheral surface linearly decreases from the first end face 160 toward the second end face 170; however, the shape of the peripheral surface of the honeycomb structural body 100 is not limited thereto. For example, the peripheral surface of the honeycomb structural body 100 can have a shape as shown in FIGS. 5 and 6, where the contour changes non-linearly (i.e., in a curved manner) from the first end face 160 toward the second end face 170. The shapes shown in FIGS. 5 and 6 can be formed by adjusting either one or both of the thickness of the coat layer 120 and the peripheral shape of the integral ceramic block 150.

The honeycomb structural body according to an embodiment of the present invention can be employed in, for example, an exhaust gas treating apparatus of a vehicle.

Figure 7:
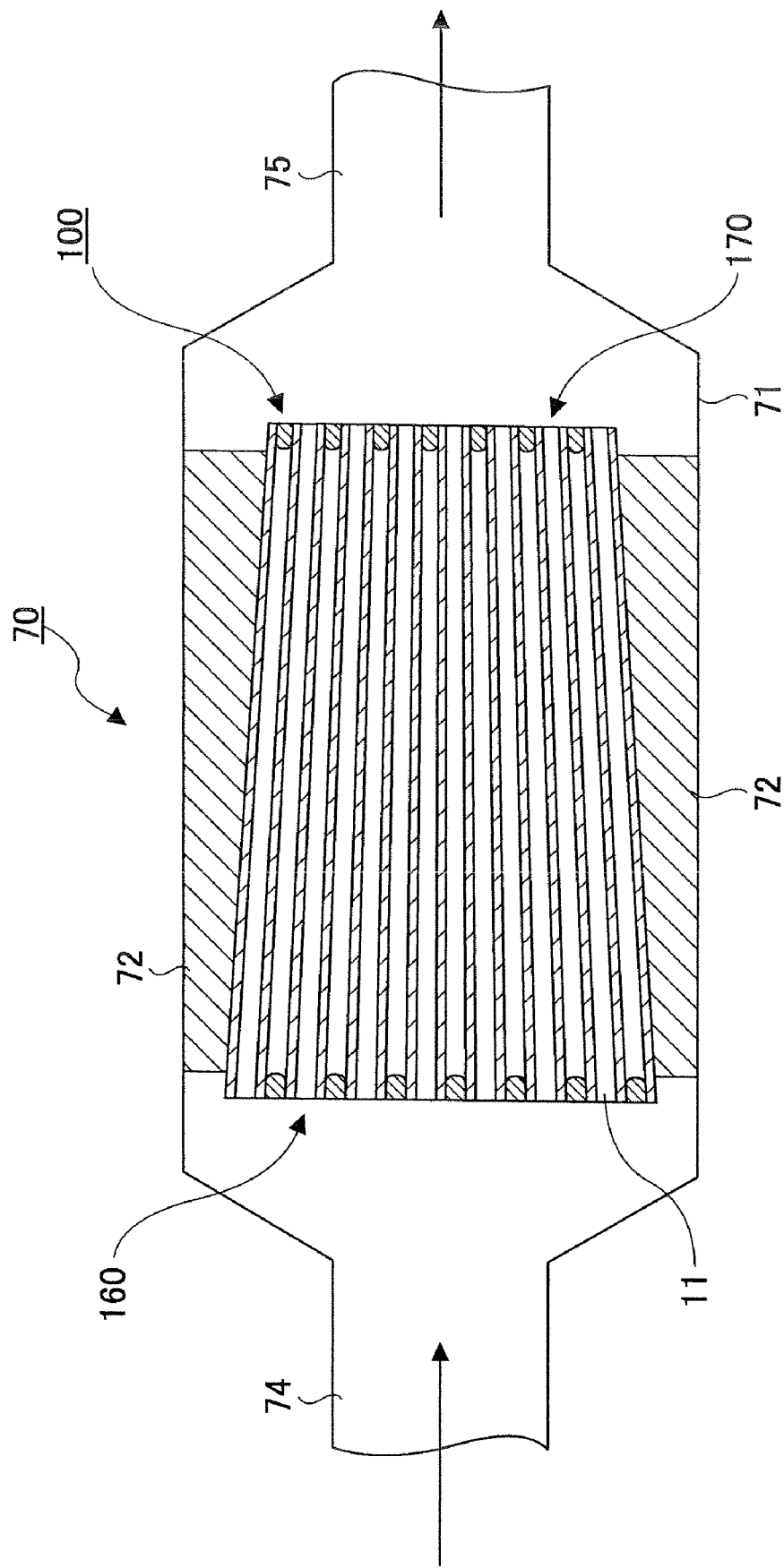
FIG. 7 is a schematic sectional view of an example of an embodiment of an exhaust gas treating apparatus equipped with the honeycomb structural body according to an embodiment of the present invention.

FIG. 7 is a schematic diagram of an example of an exhaust gas treating apparatus 70 equipped with the honeycomb structural body 100 according to an embodiment of the present invention. In FIG. 7, the honeycomb structural body 100 is used as a DPF in which each of the cells 11 is sealed at one end. In the example shown in FIG. 7, the coat layer 120 is not applied to the integral ceramic block 150.

As shown in FIG. 7, the exhaust gas treating apparatus 70 primarily includes the honeycomb structural body 100, a metal casing 71 for housing the honeycomb structural body 100, and a holding seal member 72 arranged between the honeycomb structural body 100 and the metal casing 71 for holding the honeycomb structural body 100 at an appropriate position. An introduction pipe 74 is connected to one end (introduction portion) of the exhaust gas treating apparatus 70 for introducing exhaust gas discharged from the internal combustion engine. A discharge pipe 75 is connected to the other end (exhaust portion) of the exhaust gas treating apparatus 70 for discharging the exhaust gas. Arrows in FIG. 7 indicate the flow of the exhaust gas.

In an embodiment of the present invention, the honeycomb structural body 100 is provided inside the casing 71 in such a manner that the first end face 160 of the honeycomb structural body 100 is arranged at the exhaust gas introduction side of the exhaust gas treating apparatus 70. Accordingly, exhaust gas discharged from the internal combustion engine is introduced into the casing 71 through the introduction pipe 74. Then, the exhaust gas flows into the honeycomb structural body 100 through the cells 11 that have openings on the side of the first end face 160 of the honeycomb structural body, which openings are facing the introduction pipe 74. The exhaust gas that has flown into the honeycomb structural body 100 passes through the cell walls 13. The exhaust gas is purified as particulates are captured by the cell walls 13. Then, the exhaust gas is discharged from the exhaust gas treating apparatus through the cells 11 that have openings on the side of the second end face 170 of the honeycomb structural body, and is finally exhausted to the outside through the discharge pipe 75. If the honeycomb structural body 100 were used as a catalyst carrier, harmful components such as CO, HC, and $NO_x$ in the exhaust gas would be removed when the exhaust gas passes through the cell walls 11 of the catalyst carrier, so that the exhaust gas is converted.

The side of the above-described exhaust gas treating apparatus 70 through which the exhaust gas is discharged becomes high-temperature. The size of this side of the exhaust gas treating apparatus 70, i.e., the size of the second end face 170 of the honeycomb structural body 100 is made small. Accordingly, even if the temperature around the second end face 170 becomes high and thermal expansion occurs, it is possible to mitigate the compressive stress applied from the casing or the holding seal member onto this portion, compared to the conventional honeycomb structural body that does not have a tapered shape. Thus, it is possible to provide a honeycomb structural body that is resistant to breakage even under high temperature.

Figure 8:
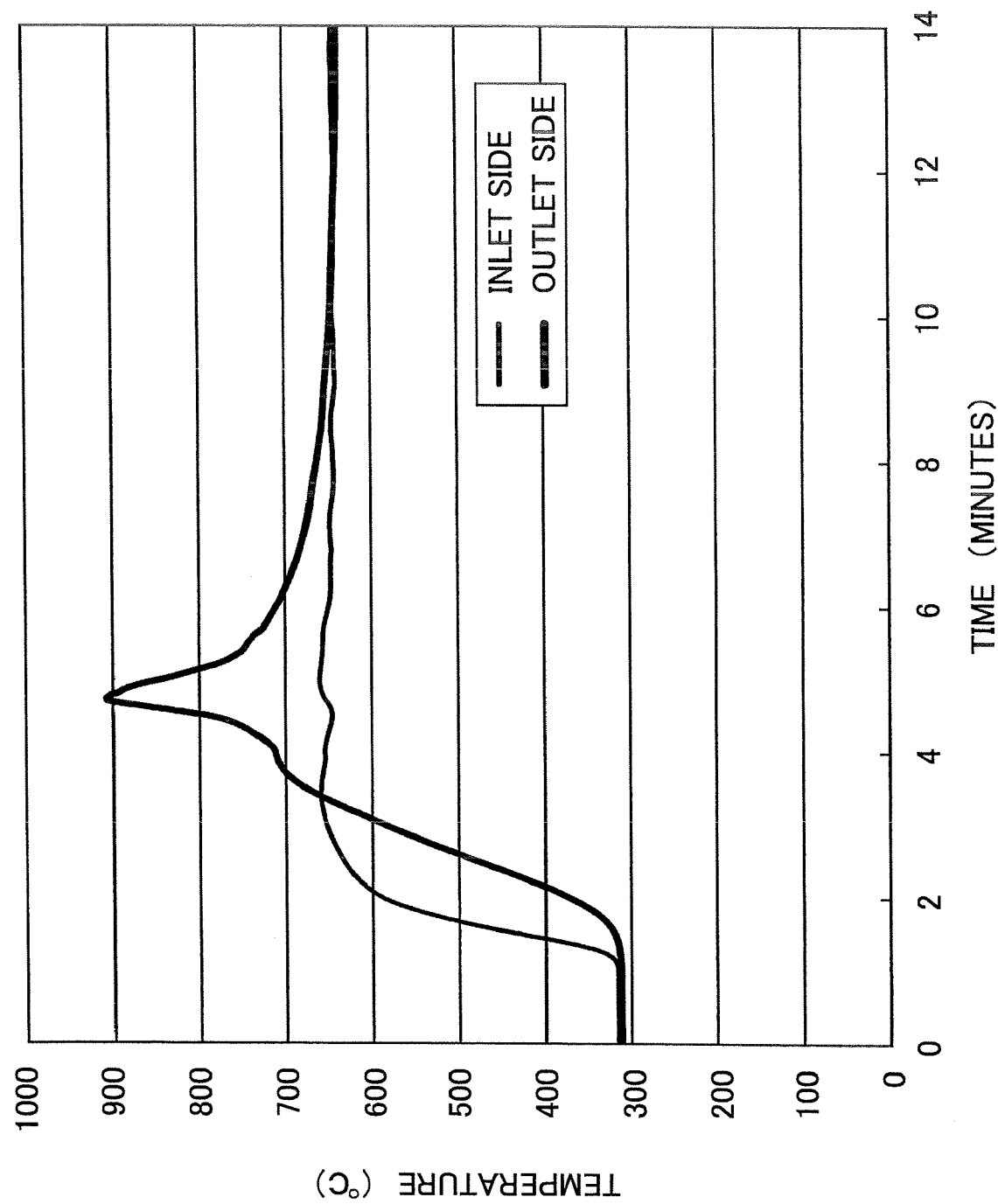
FIG. 8 is a graph indicating the temperature variations of a general honeycomb structural body at the inlet and the outlet while performing a regenerating process.

FIG. 8 indicates the temperature variations of an exhaust gas treating apparatus equipped with a general honeycomb structural body (i.e., whose peripheral surface does not have a tapered shape) while performing a regenerating process. In FIG. 8, the thin curved line indicates temperature variations near the inlet of the honeycomb structural body (substantially at the center of a face that is 13 mm inside from the end of the inlet in the lengthwise direction). The thick curved line indicates temperature variations near the outlet of the honeycomb structural body (substantially at the center of a face that is 13 mm inside from the end of the outlet in the lengthwise direction). As shown in FIG. 8, when a regenerating process is performed in the honeycomb structural body, the outlet side of the honeycomb structural body reaches an extremely high temperature, exceeding 900° C. However, the honeycomb structural body according to an embodiment of the present invention is resistant to breakage near the outlet, even while such a regenerating process is being performed.

The above describes the characteristics of the embodiment of the present invention by taking as an example the honeycomb structural body 100 including the integral ceramic block 150 that is fabricated by integral molding. However, the present invention is also applicable to another kind of honeycomb structural body 200, which is made by joining together a plurality of porous honeycomb units 230 with adhesive layers 210 made of an adhesive.

Figure 9:
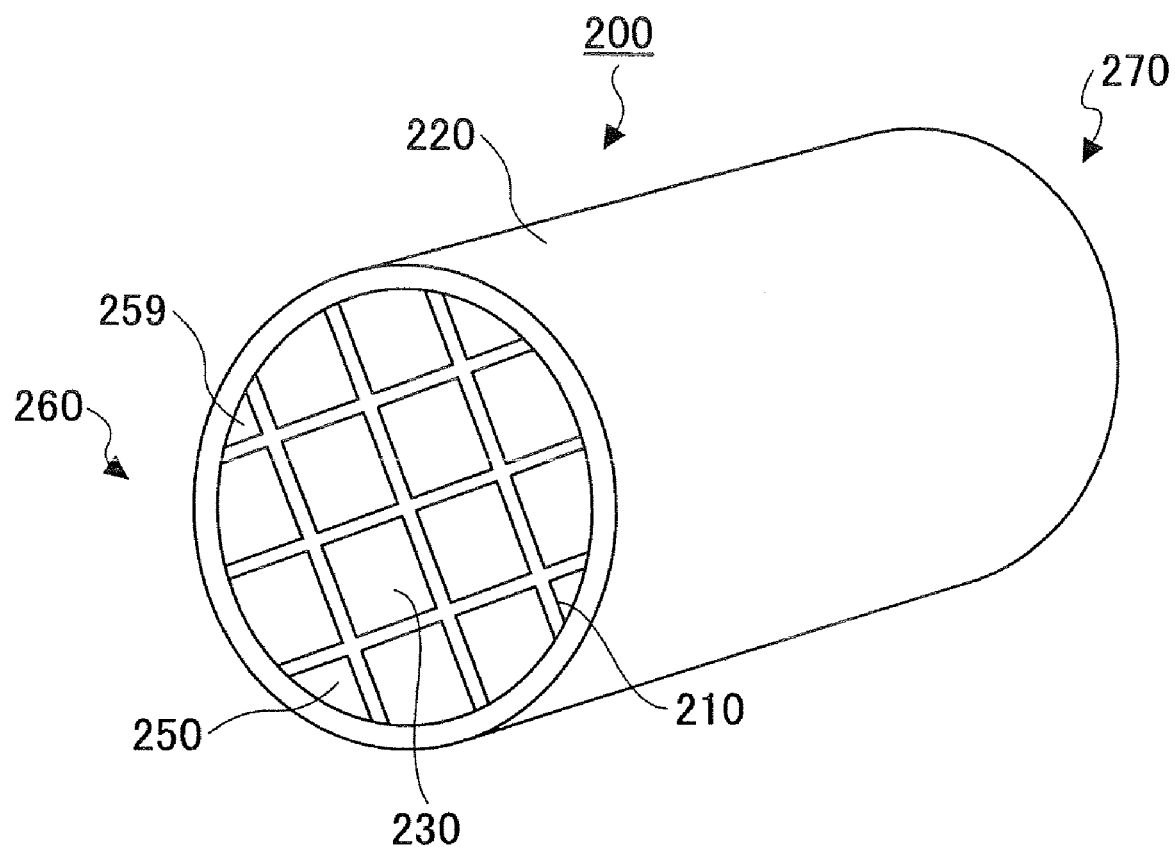
FIG. 9 is a schematic perspective view of an example of a joint type honeycomb structural body according to an embodiment of the present invention.

FIG. 9 illustrates an example of a honeycomb structural body with such a configuration. Hereinafter, the honeycomb structural body shown in FIGS. 1 and 2 is referred to as an "integral type honeycomb structural body". Hereinafter, the honeycomb structural body shown in FIG. 9 that is made by joining together a plurality of porous honeycomb units 230 by interposing the adhesive layers 210 is referred to as a "joint type honeycomb structural body".

As shown in FIG. 9, the joint type honeycomb structural body 200 includes a first end face 260 and a second end face 270 that are substantially parallel to each other. The joint type honeycomb structural body 200 also includes a ceramic block 250 and a coat layer 220 applied on the periphery of the ceramic block 250, excluding the two end faces of the ceramic block 250. The ceramic block 250 includes a first end face 259 and a second end face 269 at positions corresponding to the first and second end faces 260 and 270 of the honeycomb structural body 200, respectively. The ceramic block 250 is made by joining together plural pillar porous honeycomb units 230 by interposing the adhesive layers 210 (the example shown in FIG. 9 includes four horizontal rows and four vertical rows, i.e., a total of 16 porous honeycomb units 230), and then cutting the peripheral to a predetermined size. The porous honeycomb units 230 shown in FIG. 10 include multiple cells 21 extending along the central axis (X axis), which cells 21 are partitioned by cell walls 23 functioning as filters. Thus, similar to the above integral ceramic block 150, each of the cells 21 is sealed by a sealing material 22 at one end.

The peripheral surface of the joint type honeycomb structural body 200 can be tapered by the same methods as the above methods 1) and 2) for tapering the integral type honeycomb structural body 100. Specifically, a joint type honeycomb structural body having a tapered shape can be made by the following methods.

1') Continuously decrease the sectional area of the face parallel to the first end face 259 of the ceramic block 250 from the first end face 259 toward the second end face 269.

2') Continuously decrease the thickness of the coat layer 220 from the first end face 260 toward the second end face 270 of the honeycomb structural body 200.

In the example shown in FIG. 9, the peripheral surface of the joint type honeycomb structural body 200 is tapered by the method 2'), i.e., the thickness of the coat layer 220 on the peripheral surface is linearly decreased from the first end face 260 toward the second end face 270.

Figure 10:
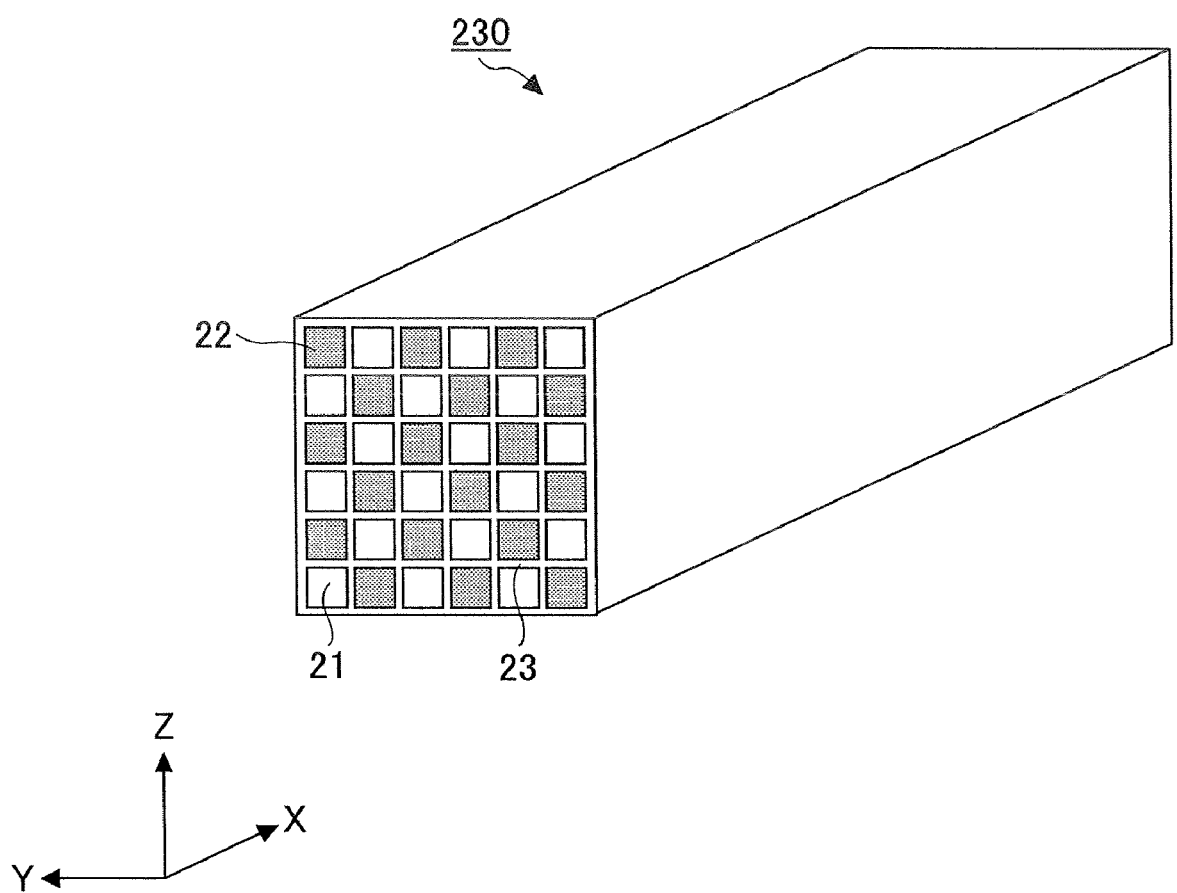
FIG. 10 is a schematic perspective view of an example of a porous honeycomb unit included in the joint type honeycomb structural body according to an embodiment of the present invention.

Meanwhile, in the case of fabricating the ceramic block 250 by the method 1'), porous honeycomb units, including at least some that have tapered peripheral surfaces, are combined together. In this manner, the ceramic block 250 is made to have a tapered side surface. For example, porous honeycomb units that do not have tapered peripheral shapes, such as that shown in FIG. 10, are arranged around the center of the ceramic block. Porous honeycomb units that have tapered peripheral shapes are arranged around the periphery of the ceramic block. Accordingly, the completed ceramic block is made to have a tapered peripheral surface.

The above integral ceramic block 150 and the porous honeycomb units 230 included in the ceramic block 250 (hereinafter, collectively referred to as "ceramic component") can be made of nitride ceramics such as aluminum nitride, silicon nitride, boron nitride, and titanium nitride; carbide ceramics such as silicon carbide, zirconium carbide, titanium carbide, tantalum carbide, and tungsten carbide; and oxide ceramics such as alumina, zirconia, cordierite, mullite, silica, and aluminum titanate. The ceramic component can be made of two or more kinds of materials such as a composite material including metal silicon and silicon carbide. When using a composite material including metal silicon and silicon carbide, the amount of additive metal silicon preferably corresponds to 0% by weight through approximately 45% by weight.

The porous honeycomb units are preferably made of silicon carbide ceramics, because among the above ceramic materials, silicon carbide ceramics have high heat resistance, superior mechanical characteristics, and high thermal conductivity. The porous honeycomb units can function as favorable filters by having mechanical characteristics coupled with filtering capabilities with the use of multiple pores. Silicon carbide ceramics refer to a material including approximately 60% by weight or more of silicon carbide. The integral ceramic block is preferably made of cordierite or aluminum titanate, which has high thermal shock properties and a low thermal expansion coefficient.

The "ceramic components", i.e., the cell walls 13, 23 and the sealing material 12, 22, are preferably made of substantially the same materials and have substantially the same porosity. Accordingly, it is possible to increase the adhesion intensity between these components and match the thermal expansion coefficient of the cell walls 13, 23 with the thermal expansion coefficient of the sealing material 12, 22. Thus, it is possible to prevent cracks or gaps from being occurred between the cell walls 13, 23 and the sealing material 12, 22 at the time of fabrication or during usage.

The length of the sealing material 12, 22 in the lengthwise direction of the cells is not particularly limited, but is preferably approximately 1 mm through approximately 20 mm and more preferably approximately 3 mm through approximately 10 mm.

The thickness of the cell walls 13, 23 is not particularly limited, but the preferable lower limit is approximately 0.1 mm in consideration of strength and the preferable upper limit is approximately 0.6 mm in consideration of pressure loss. The thickness of the cell walls 13, 23 along the lengthwise direction of the cells does not need to be constant. Taking as an example the integral ceramic block 150 having a side surface as shown in FIG. 2, the thickness of at least some of the cell walls 13 (particularly the cell walls close to the periphery) can be different from that of FIG. 2; the thickness can gradually decrease from the first end face 160 toward the second end face 170. Similarly, if the porous honeycomb unit has a tapered peripheral surface, the thickness of at least some of the cell walls 23 (particularly the cell walls close to the periphery) can gradually decrease from the first end face 259 toward the second end face 269 of the ceramic block 250.

In the joint type honeycomb structural body 200 according to the embodiment of the present invention, the adhesive layers 210 and the coat layer 220 can be made of the same material or different materials. These layers can be dense or porous. However, in consideration of sealing properties, they are preferably dense. The adhesive layers 210 and the coat layer 220 can be made of any material. For example, they can be made of an inorganic binder, an organic binder, and inorganic fiber and/or inorganic particles.

Examples of an inorganic binder are silica sol, alumina, and the like. These can be used individually or two or more binders can be used in combination. Among these inorganic binders, silica sol is preferable.

Examples of an organic binder are polyvinyl alcohol, methyl cellulose, ethyl cellulose, carboxymethyl cellulose, and the like. These can be used individually or two or more binders can be used in combination. Among these organic binders, carboxymethyl cellulose is preferable.

Examples of inorganic fiber are ceramic fiber such as silica-alumina, mullite, alumina, and silica. These can be used individually or two or more kinds of fiber can be used in combination. Among these kinds of inorganic fiber, silica-alumina fiber is preferable.

Examples of inorganic particles are carbide, nitride, and the like. Specifically, inorganic powder or whiskers including silicon carbide, silicon nitride, arsenic nitride, and the like can be used. These can be used individually or two or more kinds of inorganic particles can be used in combination. In the present specification, it is assumed that inorganic powders or whiskers are included among inorganic particles. Among these kinds of inorganic particles, silicon carbide is preferable in terms of superior thermal conductivity.

Typically, the adhesive layers 210 and the coat layer 220 are formed by preparing a paste including the above ingredients as the material, applying this paste to predetermined portions, and allowing the paste to dry. According to need, a pore-forming material can be added to the paste acting as the material. Examples of the pore-forming material are balloons that are microscopic hollow spheres primarily including oxidized ceramics, spherical acrylic particles, graphite, and the like.

In the honeycomb structural body 100, 200 according to an embodiment of the present invention, the sectional shape of the face parallel to the first end face 160, 260 (or second end face 170, 270) can be any shape as long as the above relationship between the first and second end faces and the range of the taper rate P are satisfied. For example, the sectional shape of the honeycomb structural body can be a circle as shown in FIGS. 1 and 9 or an oval, a polygon, or the like. When the shape is a polygon, each vertex can be chamfered.

Furthermore, the shape of the cells 11, 21 as viewed from the first end face of the honeycomb structural body can be any shape, such as a square, a rectangle, a triangle, a hexagon, and an octagon. All of the cells need not be the same shape; the cells can have different shapes from each other.

Figure 11:
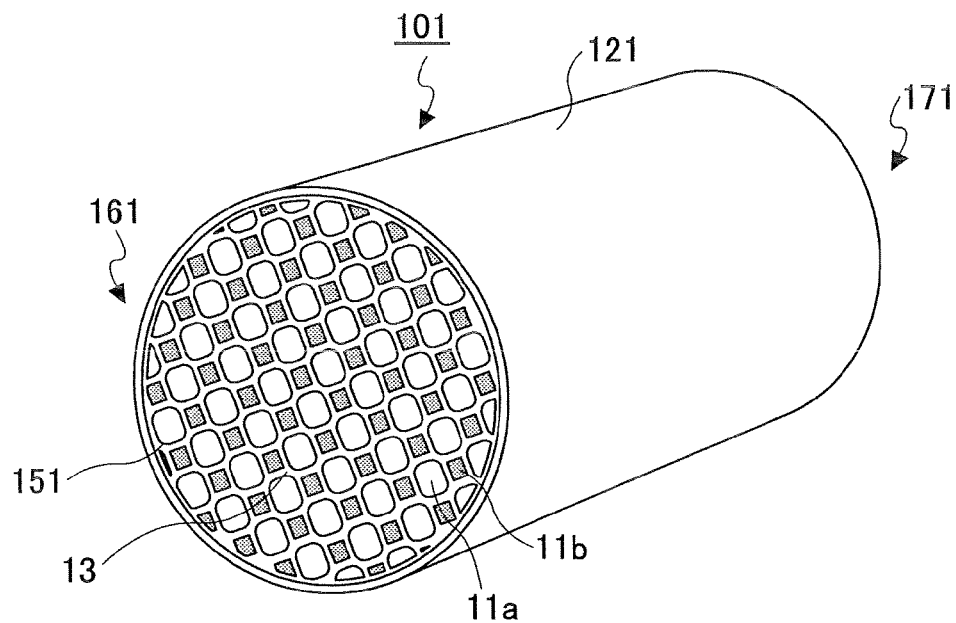
FIG. 11 illustrates an embodiment of an integral type honeycomb structural body having cells provided in two kinds of sectional shapes.
Figure 12:
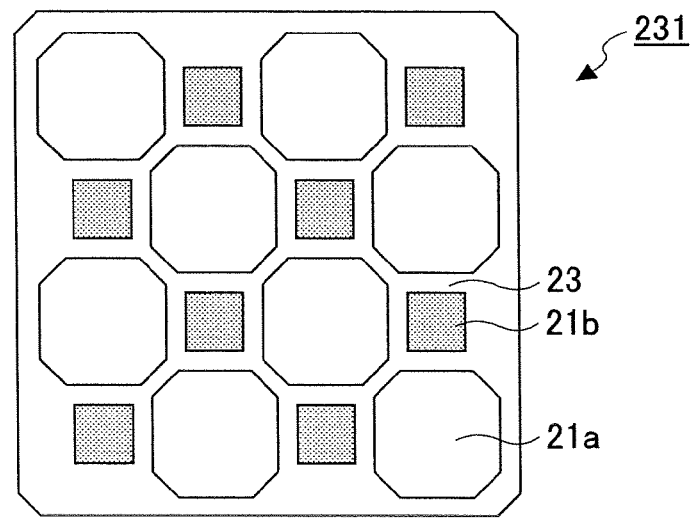
FIG. 12 illustrates an embodiment of a porous honeycomb unit having cells provided in two kinds of sectional shapes as viewed from one of the end faces.
Figure 13:
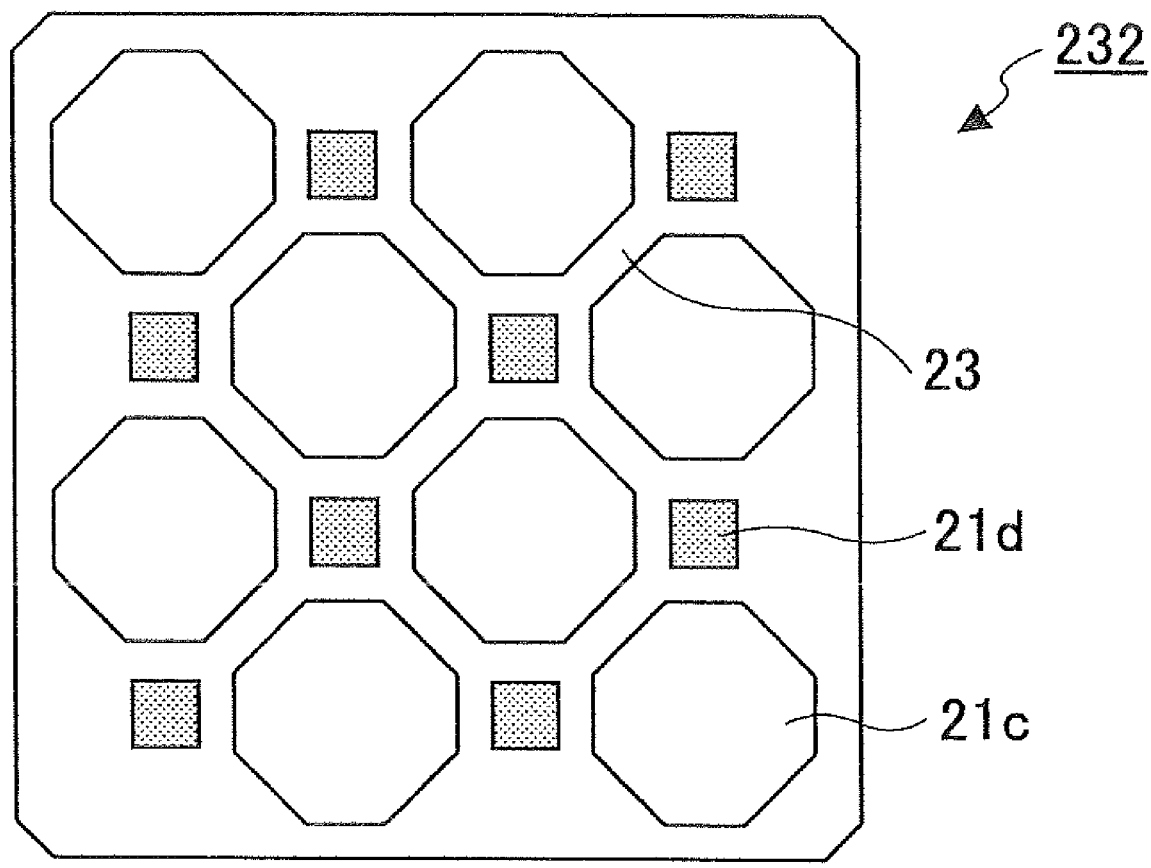
FIG. 13 illustrates an embodiment of another porous honeycomb unit having cells provided in two kinds of sectional shapes as viewed from one of the end faces.

FIG. 11 illustrates an example of an integral type honeycomb structural body 101 different from that of FIG. 1. The integral type honeycomb structural body 101 includes first and second end faces 161, 171. FIGS. 12 and 13 illustrate porous honeycomb units included in a joint type honeycomb structural body different from those of FIG. 9, viewed from one of the end faces. In the example shown in FIG. 11, an integral ceramic block 151 includes two kinds of cells, namely, cells 11a that have an octagonal sectional shape and cells 11b that have a square shape. The square cells 11b are sealed at the end of the first end face 161 of the honeycomb structural body 101 and the octagonal cells 11a are sealed at the end of the second end face 171 of the honeycomb structural body 101. Similarly, a porous honeycomb unit 231 shown in FIG. 12 includes cells 21a that have an octagonal sectional shape and cells 21b that have a square shape. Furthermore, a porous honeycomb unit 232 shown in FIG. 13 includes cells 21c that have an octagonal sectional shape and cells 21d that have a square shape, which are different from those of FIG. 12. Considering the thickness of cell walls of these cell arrangements viewed from the sectional area perpendicular to the axial direction, the volume of walls tends to be relatively less than that of a honeycomb structural body in which all of the cells 11, 21 have equal sectional areas (e.g., as shown in FIGS. 1, 9). Accordingly, this honeycomb structural body (with cells of different shapes) has lower compressive strength, particularly around the second end face of the honeycomb structural body. However, according to an embodiment of the present invention, even such a honeycomb structural body (with cells of different shapes) is resistant to breakage at the end on the outlet side during usage, due to the above effects.

(Method of Fabricating Integral Type Honeycomb Structural Body)

Next, a method of fabricating a honeycomb structural body according to an embodiment of the present invention is described by taking as an example the integral type honeycomb structural body 100.

First, extrusion molding is performed using raw material paste including the abovementioned ceramic material as the primary ingredient to fabricate a pillar (i.e., peripheral surface is substantially parallel to a center axial direction) molded body of an integral ceramic block.

A preferable example of the raw material paste is, but not limited to, a raw material paste that produces an integral ceramic block having a porosity of approximately 40% through approximately 75% after fabrication. To achieve this porosity, it is possible to add a binder and a dispersed solvent to a powder including the above ceramics. The particle size of the ceramic powder is not particularly limited, but preferably does not contract in post-processes. For example, a preferable combination is 100 pts.wt. of powder having an average particle size of approximately 0.3 μm through approximately 50 μm and approximately 5 pts.wt. through approximately 65 pts.wt. of powder having an average particle size of approximately 0.1 μm through approximately 1.0 μm.

Examples of the binder are, but not limited to, methyl cellulose, carboxymethyl cellulose, hydroxyethyl cellulose, polyethylene glycol, and the like. The blending quantity of the binder is typically approximately 1 pts.wt. through approximately 10 pts.wt. with respect to 100 pts.wt. of ceramic powder.

Examples of the dispersed solvent are, but not limited to, organic solvents such as benzene, alcohol such as methanol, water, and the like. An appropriate amount of the dispersed solvent is blended so that the viscosity of the raw material paste falls in a predetermined range.

The ceramic powder, the binder, and the dispersed solvent are mixed together with an attritor and sufficiently kneaded with a kneader, and are then subjected to extrusion molding.

A molding assistant can be added to the raw material paste according to need. Examples of the molding assistant are, but not limited to, ethylene glycol, dextrin, fatty acid, fatty acid soap, polyvinyl alcohol, and the like. A pore-forming material such as balloons that are microscopic hollow spheres including oxidized ceramics, spherical acrylic particles, graphite, and the like can be added to the raw material paste according to need.

Next, the molded body formed by extrusion molding is dried to be turned into a dry body. The drying process is performed by using a micro dryer, a hot air dryer, a dielectric dryer, a decompression dryer, a vacuum dryer, a freeze dryer, and the like. Next, at both end faces of the dry body, the sealing material paste is supplied into end portions of predetermined cells, so that each cell is sealed at either one of the ends.

A preferable example of the sealing material paste is, but not limited to, a sealing material paste that has a porosity of approximately 30% through approximately 75% after the post-process. For example, the same raw material paste as described above can be used.

Next, the dry body filled with the sealing material paste is subjected to a degreasing process (e.g., at approximately 200 C.° through approximately 500 C.°) and a firing process (e.g., at approximately 1,400 C.° through approximately 2,300 C.°) under predetermined conditions, thereby fabricating an integral ceramic block having a side surface parallel along the central axis. The conditions under which the degreasing process and the firing process are performed can be the same as those for fabricating a conventional honeycomb structural body.

Next, the raw material paste, the sealing material paste, or another raw material paste is applied onto the side surface of the integral ceramic block, and is then dried and fixed thereon, thereby forming the coat layer.

After the coat layer is dried and solidified, the coat layer is polished to make the honeycomb structural body have a tapered peripheral surface. An integral type honeycomb structural body having the above characteristic shape can be fabricated by performing these processes.

This fabricating method is one example; it is obvious to those skilled in the art that the integral type honeycomb structural body can be fabricated by other methods. For example, as described above, an integral type honeycomb structural body having a tapered shape can be fabricated by forming an integral ceramic block having a tapered side surface along the central axis, and then applying a coat layer at a constant thickness. Furthermore, in the above fabricating method, the order of performing the process of sealing the end portions of the cells in the integral ceramic block and the process of firing the molded body of the integral ceramic block can be reversed.

(Method of Fabricating Joint Type Honeycomb Structural Body)

The joint type honeycomb structural body 200 can also be fabricated by the same processes.

First, extrusion molding is performed using raw material paste including the abovementioned ceramic material as the primary ingredient to fabricate a molded body of a honeycomb unit shaped as a rectangular pillar.

Next, the molded body of a honeycomb unit formed by extrusion molding is dried to be turned into a honeycomb unit dry body. The drying process is performed by using a micro dryer, a hot air dryer, a dielectric dryer, a decompression dryer, a vacuum dryer, a freeze dryer, and the like. Next, a predetermined amount of the sealing material paste is supplied into end portions of predetermined cells of the honeycomb unit dry body, so that each cell is sealed at one of the ends.

Next, the honeycomb unit dry body supplied with the sealing material paste is subjected to a degreasing process (e.g., at approximately 200 C.° through approximately 500 C.°) and a firing process (e.g., at approximately 1,400 C.° through approximately 2,300 C.°) under predetermined conditions, thereby fabricating a porous honeycomb unit shaped as a rectangular pillar.

Next, on the side surfaces of the porous honeycomb unit, an adhesive layer paste that is to act as adhesive layers is applied with a uniform thickness. Then, other porous honeycomb units are sequentially laminated by interposing the adhesive layer paste. This process is repeated to fabricate a ceramic block of a desired size (e.g., four horizontal rows and four vertical rows of porous honeycomb units). The above raw material paste or the sealing material paste can be used as the adhesive layer paste.

Next, this ceramic block is heated to dry and solidify the adhesive layer paste so that the adhesive layer paste is turned into adhesive layers and the porous honeycomb units are fixed to each other.

Next, a diamond cutter is used to cut the ceramic block into a cylindrical shape to fabricate a cylindrical ceramic block whose side surface is parallel along the axial direction.

Then, the coat layer is formed by applying the above sealing material paste or another raw material paste for the coat layer to the side surface of the ceramic block 250 and performing a drying process to fix the coat layer.

After the coat layer is dried and solidified, the coat layer is polished to make the honeycomb structural body have a tapered peripheral surface. A joint type honeycomb structural body having the above characteristic shape can be fabricated by performing these processes.

In the case of the joint type honeycomb structural body, the ceramic block having a tapered shape can be fabricated as described above by combining together porous honeycomb units of any peripheral shape. Furthermore, it is possible to fabricate porous honeycomb units from honeycomb unit molded bodies of different shapes and then laminate these on top of each other by interposing the adhesive layer paste, thereby forming the ceramic block. In this case, the process of cutting the side surface can be omitted.

(Method of Fabricating Catalyst Carrier)

In the above examples, the honeycomb structural bodies 100, 200 are used as DPFs. The honeycomb structural body can also be used as a catalyst carrier for converting CO, HC, $NO_x$, and the like in the exhaust gas. A method of fabricating a catalyst carrier is described below with the use of the honeycomb structural body according to an embodiment of the present invention.

To use the honeycomb structural body according to an embodiment of the present invention as a catalyst carrier, a process of providing catalysts made of noble metal onto the cell walls is performed instead of the process of sealing the end portions of the cells.

First, a catalyst carrier layer is provided onto the cell walls. The catalyst carrier can be made of oxide ceramics such as alumina, titania, zirconia, silica, and ceria. An example of a method of forming an alumina catalyst carrier layer on the cell walls is to immerse the honeycomb structural body in a solution including alumina powder, pulling the honeycomb structural body out from the solution, and then heating the honeycomb structural body. Further, the honeycomb structural body can be immersed in a solution including $Ce(NO_3)_3$ to impregnate the catalyst carrier layer with a rare-earth element.

Next, a catalyst is provided in the catalyst carrier layer. Examples of the material of the catalyst are, but not particularly limited to, noble metals such as platinum, palladium, and rhodium. A compound including alkali metal, alkali earth metal, a rare earth element, a transition metal, and the like can be carried in the catalyst carrier layer. An example of a method of providing a platinum catalyst is to impregnate a solution of dinitro diammineplatinum nitrate ($[Pt(NH_3)_2(NO_2)_2]HNO_3$) with a "ceramic component", which is provided with the catalyst carrier layer, and then heating the "ceramic component".

In the case of the integral type honeycomb structural body 100, after the integral ceramic block 150 is fabricated, the catalyst is provided by the above process. In the case of the joint type honeycomb structural body 200, the catalyst can be provided at any stage as long as the porous honeycomb units 230 have been fabricated.

Effects of an embodiment of the present invention are described in detail in the following practical examples.

Practical Example 1

<Fabrication of Joint Type Honeycomb Structural Body>

First, 40% by weight of γ alumina particles (average particle size 2 μm), 10% by weight of silica-alumina fiber (average fiber diameter 10 μm, average fiber length 100 μm, aspect ratio 10), and 50% by weight of silica sol (solid concentration 30% by weight) were mixed together. Then, 6 pts.wt. of methylcellulose functioning as an organic binder and small amounts of a plasticizer and a lubricant were added to 100 pts.wt. of the resultant mixture. This mixture was further mixed and kneaded to produce a mixed composition. This mixed composition was subjected to extrusion molding by using an extrusion molding apparatus to obtain a raw molded body.

Next, the raw molded body was sufficiently dried using a micro dryer and a hot air dryer, and was degreased by being kept in an atmosphere of 400° C. for two hours. Then, the molded body was fired by being kept in an atmosphere of 800° C. for two hours. Accordingly, a honeycomb unit shaped as a rectangular pillar (34.3 mm×34.3 mm×150 mm) having a substantially square cell sectional shape, a cell density of 93 cells/cm$^2$ (600 cpsi), and a wall thickness of 0.2 mm, was fabricated.

Next, a sealing material paste was prepared by mixing together 29% by weight of γ alumina particles (average particle size 2 μm), 7% by weight of silica-alumina fiber (average fiber diameter 10 μm, average fiber length 100 μm), 34% by weight of silica sol (solid concentration 30% by weight), 5% by weight of carboxymethyl-cellulose, and 25% by weight of water. A predetermined amount of this sealing material paste was supplied into end portions of predetermined cells of the honeycomb unit, so that each cell was sealed at either one of the ends.

Next, an adhesive layer paste having the same composition as the above sealing material paste was used to join the honeycomb units together. The thickness of the adhesive layer was 1 mm. Accordingly, a ceramic block was fabricated, with four horizontal rows and four vertical rows of honeycomb units joined together.

Next, a diamond cutter was used to cut the ceramic block into a cylindrical shape. The first and second end faces of the resultant ceramic block were circles with a diameter of 141 mm.

Next, in order to form a coat layer on the peripheral surface, the above adhesive layer paste was used as a coat layer paste. This coat layer paste was applied onto the side surface (i.e., the cut surface) of the ceramic block. The paste was applied in such a manner that its thickness gradually decreases from the first end face (thickness of 2.0 mm) to the second end face (thickness of 0.5 mm). Next, this was dried at 120° C. and then kept in an atmosphere of 700° C. to degrease the adhesive layers and the peripheral coat layer. Accordingly, a honeycomb structural body having a tapered peripheral shape (a honeycomb structural body with a first end face having a diameter of 143 mm, a second end face having a diameter of 142 mm, and a length of 150 mm) was obtained. The taper rate P of this honeycomb structural body was 1%.

<Regeneration Test>

An exhaust gas treating apparatus employing the honeycomb structural body fabricated as above was used to perform a regeneration test. In the exhaust gas treating apparatus, an inorganic fiber mat (6 mm thick) was wrapped around the circumference of the honeycomb structural body. The honeycomb structural body with the mat wrapped around it was arranged inside a metal casing (inner diameter 150 mm×length 190 mm). The honeycomb structural body was installed in the exhaust gas treating apparatus in such a manner that its first end face corresponds to the inlet side of the apparatus.

The regeneration test was performed as follows, with the exhaust gas treating apparatus arranged at the inflow side of an exhaust pipe of an engine (a two liter direct-injection engine). First, the engine was operated for nine hours at a speed of 2,000 rpm and a torque of 100 Nm, and the honeycomb structural body was made to capture approximately 18.8 g/L of soot. Next, to burn the soot captured in the honeycomb structural body, the method of operating the engine was switched to a post injection method. The engine was operated in such a manner that when one minute passed after starting the post injection, the temperature of the inlet of the honeycomb structural body became approximately 600° C. After the soot was burned, the engine was stopped, the honeycomb structural body was retrieved from the exhaust gas treating apparatus, and it was confirmed whether the honeycomb structural body was broken.

After performing the test, it was confirmed that the honeycomb structural body was not broken around its second end surface.

Practical Example 2

A joint type honeycomb structural body was fabricated and arranged in the exhaust gas treating apparatus by the same method as that of practical example 1. However, in practical example 2, the coat layer paste was applied in such a manner that its thickness gradually decreases from the first end face (5.0 mm thick) to the second end face (0.5 mm thick). Thus, the taper rate P of the final honeycomb structural body was 3%.

A regeneration test was performed by the same method as that of practical example 1, with the exhaust gas treating apparatus equipped with this honeycomb structural body. After performing the test, it was confirmed that the honeycomb structural body was not broken around its second end surface.

Practical Example 3

A joint type honeycomb structural body was fabricated and arranged in the exhaust gas treating apparatus by the same method as that of practical example 1. However, in practical example 3, the coat layer paste was applied in such a manner that its thickness gradually decreases from the first end face (6.5 mm thick) to the second end face (0.5 mm thick). Thus, the taper rate P of the final honeycomb structural body was 4%.

A regeneration test was performed by the same method as that of practical example 1, with the exhaust gas treating apparatus equipped with this honeycomb structural body.

After performing the test, it was confirmed that the honeycomb structural body was not broken around its second end surface.

Comparative Example 1

A joint type honeycomb structural body was fabricated and arranged in the exhaust gas treating apparatus by the same method as that of practical example 1. However, in comparative example 1, the coat layer paste was applied in such a manner that its thickness is substantially constant from the first end face (0.5 mm thick) to the second end face (0.5 mm thick). Thus, the taper rate P of the final honeycomb structural body was 0%.

A regeneration test was performed by the same method as that of practical example 1, with the exhaust gas treating apparatus equipped with this honeycomb structural body. After performing the test, it was confirmed that the honeycomb structural body was broken around its second end surface.

According to one embodiment of the present invention, a pillar-shaped honeycomb structural body includes a first end face and a second end face substantially parallel to each other; and a peripheral surface connecting the first end face and the second end face. The first end face and the second end face have similar peripheral shapes. A taper rate P satisfies $0<P\leq$ approximately 4%, the taper rate P being expressed by the following formula (1)

$$\text{taper rate } P(\%) = (D1-D2)/(2L) \times 100 \qquad \text{formula (1)}$$

where the maximum width of the first end face is $D1$, the maximum width of the second end face is $D2$, and the distance between the first end face and the second end face is L.

In the honeycomb structural body according to the embodiment of the present invention, the contour of the peripheral surface is preferably a linear line or a curved line or a combination of a linear line and a curved line.

The sectional area of the honeycomb structural body parallel to the first end face is preferably configured to monotonously decrease from the first end face toward the second end face.

The first end face and the second end face of the honeycomb structural body are both preferably circular.

The peripheral surface of the honeycomb structural body preferably has a coat layer applied thereon.

The thickness of the coat layer is preferably substantially constant from the first end face to the second end face. Furthermore, the thickness of the coat layer preferably decreases from the first end face to the second end face.

The honeycomb structural body preferably further includes plural penetrating cells penetrating the honeycomb structural body from the first end face to the second end face, the penetrating cells being partitioned by partitioning walls.

At least some of the plural penetrating cells are preferably configured in such a manner that the sectional area of some of the plural penetrating cells parallel to the first end face decreases from the first end face toward the second end face.

The penetrating cells are preferably provided in at least two different shapes as viewed from the first end face.

Each of the penetrating cells is preferably sealed at either one of the ends. Furthermore, a catalyst is preferably provided in the walls.

Furthermore, the thickness of the walls preferably falls in a range of approximately 0.1 mm through approximately 0.6 mm.

The honeycomb structural body according to the embodiment of the present invention preferably further includes plural pillar-shaped honeycomb units; and adhesive layers configured to join together the honeycomb units.

Furthermore, the honeycomb structural body is preferably an integral ceramic block, which is a single piece fabricated by an integral molding method.

Furthermore, according to one embodiment of the present invention, an exhaust gas treating apparatus preferably includes an introduction portion through which exhaust gas is introduced; an exhaust portion through which the exhaust gas is discharged; and the honeycomb structural body described above, the honeycomb structural body being provided between the introduction portion and the discharge portion. The honeycomb structural body is provided in such a manner that the first end face faces the introduction portion through which the exhaust gas is introduced.

Furthermore, in the honeycomb structural body of the exhaust gas treating apparatus, the contour of the peripheral surface is preferably a linear line or a curved line or a combination of a linear line and a curved line, and the sectional area of the honeycomb structural body parallel to the first end face is preferably configured to monotonously decrease from the first end face toward the second end face.

Furthermore, in the honeycomb structural body of the exhaust gas treating apparatus, the first end face and the second end face of the honeycomb structural body are both preferably circular.

Furthermore, in the honeycomb structural body of the exhaust gas treating apparatus, the peripheral surface preferably has a coat layer applied on its surface.

Furthermore, in the honeycomb structural body of the exhaust gas treating apparatus, the peripheral surface preferably has a coat layer applied on its surface; and the thickness of the coat layer is preferably substantially constant from the first end face to the second end face.

Furthermore, in the honeycomb structural body of the exhaust gas treating apparatus, the peripheral surface preferably has a coat layer applied on its surface; and the thickness of the coat layer preferably decreases from the first end face to the second end face.

Furthermore, the honeycomb structural body of the exhaust gas treating apparatus preferably further includes plural penetrating cells penetrating the honeycomb structural body from the first end face to the second end face, the penetrating cells being partitioned by walls; wherein at least some of the plural penetrating cells are preferably configured in such a manner that the sectional area of the some of the plural penetrating cells parallel to the first end face decreases from the first end face toward the second end face.

Furthermore, the honeycomb structural body of the exhaust gas treating apparatus preferably further includes plural penetrating cells penetrating the honeycomb structural body from the first end face to the second end face, the penetrating cells being partitioned by walls; wherein at least some of the plural penetrating cells are preferably configured in such a manner that the sectional area of the some of the plural penetrating cells parallel to the first end face decreases from the first end face toward the second end face; and the penetrating cells are preferably provided in at least two different shapes as viewed from the first end face.

Furthermore, the honeycomb structural body of the exhaust gas treating apparatus preferably further includes plural penetrating cells penetrating the honeycomb structural body from the first end face to the second end face, the penetrating cells being partitioned by walls; wherein at least some of the plural penetrating cells are preferably configured in such a manner that the sectional area of the some of the plural penetrating cells parallel to the first end face decreases from the first end face toward the second end face; and each of the penetrating cells is preferably sealed at either one end.

Furthermore, the honeycomb structural body of the exhaust gas treating apparatus preferably further includes plural penetrating cells penetrating the honeycomb structural body from the first end face to the second end face, the penetrating cells being partitioned by walls; wherein at least some of the plural penetrating cells are preferably configured in such a manner that the sectional area of the some of the plural penetrating cells parallel to the first end face decreases from the first end face toward the second end face; and a catalyst is preferably provided in the walls.

Furthermore, the honeycomb structural body of the exhaust gas treating apparatus preferably further includes plural penetrating cells penetrating the honeycomb structural body from the first end face to the second end face, the penetrating cells being partitioned by walls; wherein at least some of the plural penetrating cells are preferably configured in such a manner that the sectional area of the some of the plural penetrating cells parallel to the first end face decreases from the first end face toward the second end face; and the thickness of the walls preferably falls in a range of approximately 0.1 mm through approximately 0.6 mm.

Furthermore, the honeycomb structural body of the exhaust gas treating apparatus preferably further includes plural pillar-shaped honeycomb units; and adhesive layers preferably configured to join together the honeycomb units. The present invention is not limited to the specifically disclosed embodiment, and variations and modifications may be made without departing from the scope of the present invention.

What is claimed is:

1. A pillar-shaped honeycomb structural body comprising:
    a first end face and a second end face substantially parallel to each other; and
    a peripheral surface connecting the first end face and the second end face, wherein:
    the first end face and the second end face have similar peripheral shapes;
    a contour of the peripheral surface is a curved line or a combination of a linear line and a curved line;
    a sectional area of the honeycomb structural body parallel to the first end face continuously decreases from the first end face toward the second end face; and
    a taper rate P satisfies 1<P ≦approximately 4%, the taper rate P being expressed by the following formula (1)

$$\text{taper rate } P(\%) = (D1-D2)/(2L) \times 100 \qquad \text{formula (1)}$$

where a maximum width of the first end face is D1, a maximum width of the second end face is D2, and a distance between the first end face and the second end face is L.

2. The honeycomb structural body according to claim 1, wherein:
    the first end face and the second end face are both circular.

3. The honeycomb structural body according to claim 1, wherein:
    the peripheral surface comprises a coat layer applied on its surface.

4. The honeycomb structural body according to claim 3, wherein:
    the thickness of the coat layer is substantially constant from the first end face to the second end face.

5. The honeycomb structural body according to claim 1, further comprising:
    plural penetrating cells penetrating the honeycomb structural body from the first end face to the second end face, the penetrating cells being partitioned by walls;
    wherein at least some of the plural penetrating cells are configured in such a manner that the sectional area of the some of the plural penetrating cells parallel to the first end face decreases from the first end face toward the second end face.

6. The honeycomb structural body according to claim 5, wherein:
    the penetrating cells are provided in at least two different shapes as viewed from the first end face.

7. The honeycomb structural body according to claim 5, wherein:
    each of the penetrating cells is sealed at either one end.

8. The honeycomb structural body according to claim 5, wherein:
    a catalyst is provided in the walls.

9. The honeycomb structural body according to claim 5, wherein:
    the thickness of the walls falls in a range of approximately 0.1 mm through approximately 0.6 mm.

10. The honeycomb structural body according to claim 1, further comprising:
    plural pillar-shaped honeycomb units; and
    adhesive layers configured to join together the honeycomb units.

11. The honeycomb structural body according to claim 9, wherein:
    the honeycomb structural body comprises an integral ceramic block, which is a single piece fabricated by an integral molding method.

12. An exhaust gas treating apparatus comprising:
    an introduction portion through which exhaust gas is introduced;
    an exhaust portion through which the exhaust gas is discharged; and
    the honeycomb structural body according to claim 1, the honeycomb structural body being provided between the introduction portion and the discharge portion, wherein:
    the honeycomb structural body is provided in such a manner that the first end face faces the introduction portion through which the exhaust gas is introduced.

13. The exhaust gas treating apparatus according to claim 12, wherein:
    in the honeycomb structural body, the first end face and the second end face are both circular.

14. The exhaust gas treating apparatus according to claim 12, wherein:
    in the honeycomb structural body, the peripheral surface comprises a coat layer applied on its surface.

15. The exhaust gas treating apparatus according to claim 12, wherein:
    in the honeycomb structural body,
    the peripheral surface comprises a coat layer applied on its surface; and
    the thickness of the coat layer is substantially constant from the first end face to the second end face.

16. The exhaust gas treating apparatus according to claim 12, wherein the honeycomb structural body further comprises:
    plural penetrating cells penetrating the honeycomb structural body from the first end face to the second end face, the penetrating cells being partitioned by walls;
    wherein at least some of the plural penetrating cells are configured in such a manner that the sectional area of the some of the plural penetrating cells parallel to the first end face decreases from the first end face toward the second end face.

17. The exhaust gas treating apparatus according to claim 12, wherein the honeycomb structural body further comprises:
plural penetrating cells penetrating the honeycomb structural body from the first end face to the second end face, the penetrating cells being partitioned by walls, wherein:
at least some of the plural penetrating cells are configured in such a manner that the sectional area of the some of the plural penetrating cells parallel to the first end face decreases from the first end face toward the second end face; and
the penetrating cells are provided in at least two different shapes as viewed from the first end face.

18. The exhaust gas treating apparatus according to claim 12, wherein the honeycomb structural body further comprises:
plural penetrating cells penetrating the honeycomb structural body from the first end face to the second end face, the penetrating cells being partitioned by walls, wherein:
at least some of the plural penetrating cells are configured in such a manner that the sectional area of the some of the plural penetrating cells parallel to the first end face decreases from the first end face toward the second end face; and
each of the penetrating cells is sealed at either one end.

19. The exhaust gas treating apparatus according to claim 12, wherein the honeycomb structural body further comprises:
plural penetrating cells penetrating the honeycomb structural body from the first end face to the second end face, the penetrating cells being partitioned by walls, wherein:
at least some of the plural penetrating cells are configured in such a manner that the sectional area of the some of the plural penetrating cells parallel to the first end face decreases from the first end face toward the second end face; and
a catalyst is provided in the walls.

20. The exhaust gas treating apparatus according to claim 12, wherein the honeycomb structural body further comprises:
plural penetrating cells penetrating the honeycomb structural body from the first end face to the second end face, the penetrating cells being partitioned by walls, wherein:
at least some of the plural penetrating cells are configured in such a manner that the sectional area of the some of the plural penetrating cells parallel to the first end face decreases from the first end face toward the second end face; and
the thickness of the walls falls in a range of approximately 0.1 mm through approximately 0.6 mm.

21. The exhaust gas treating apparatus according to claim 12, wherein the honeycomb structural body further comprises:
plural pillar-shaped honeycomb units; and
adhesive layers configured to join together the honeycomb units.

22. A pillar-shaped honeycomb structural body comprising:
a first end face and a second end face substantially parallel to each other; and
a peripheral surface connecting the first end face and the second end face, wherein:
the first end face and the second end face have similar peripheral shapes; and
a taper rate P satisfies $0<P<$approximately 4%, the taper rate P being expressed by the following formula (1)

$$\text{taper rate } P(\%)=(D1-D2)/(2L) \times 100 \qquad \text{formula (1)}$$

where the maximum width of the first end face is D1, the maximum width of the second end face is D2, and the distance between the first end face and the second end face is L, wherein:
the peripheral surface comprises a coat layer applied on its surface, and
the thickness of the coat layer decreases from the first end face to the second end face.

23. An exhaust gas treating apparatus comprising:
an introduction portion through which exhaust gas is introduced;
an exhaust portion through which the exhaust gas is discharged; and
a pillar-shaped honeycomb structural body comprising:
a first end face and a second end face substantially parallel to each other; and
a peripheral surface connecting the first end face and the second end face, wherein:
the first end face and the second end face have similar peripheral shapes; and
a taper rate P satisfies $0<P \leq$approximately 4%, the taper rate P being expressed by the following formula (1)

$$\text{taper rate } P(\%)=(D1-D2)/(2L) \times 100 \qquad \text{formula (1)}$$

where the maximum width of the first end face is D1, the maximum width of the second end face is D2, and the distance between the first end face and the second end face is L, the honeycomb structural body being provided between the introduction portion and the discharge portion, wherein:
the honeycomb structural body is provided in such a manner that the first end face faces the introduction portion through which the exhaust gas is introduced, wherein:
in the honeycomb structural body,
the peripheral surface comprises a coat layer applied on its surface; and
the thickness of the coat layer decreases from the first end face to the second end face.

* * * * *